June 6, 1961

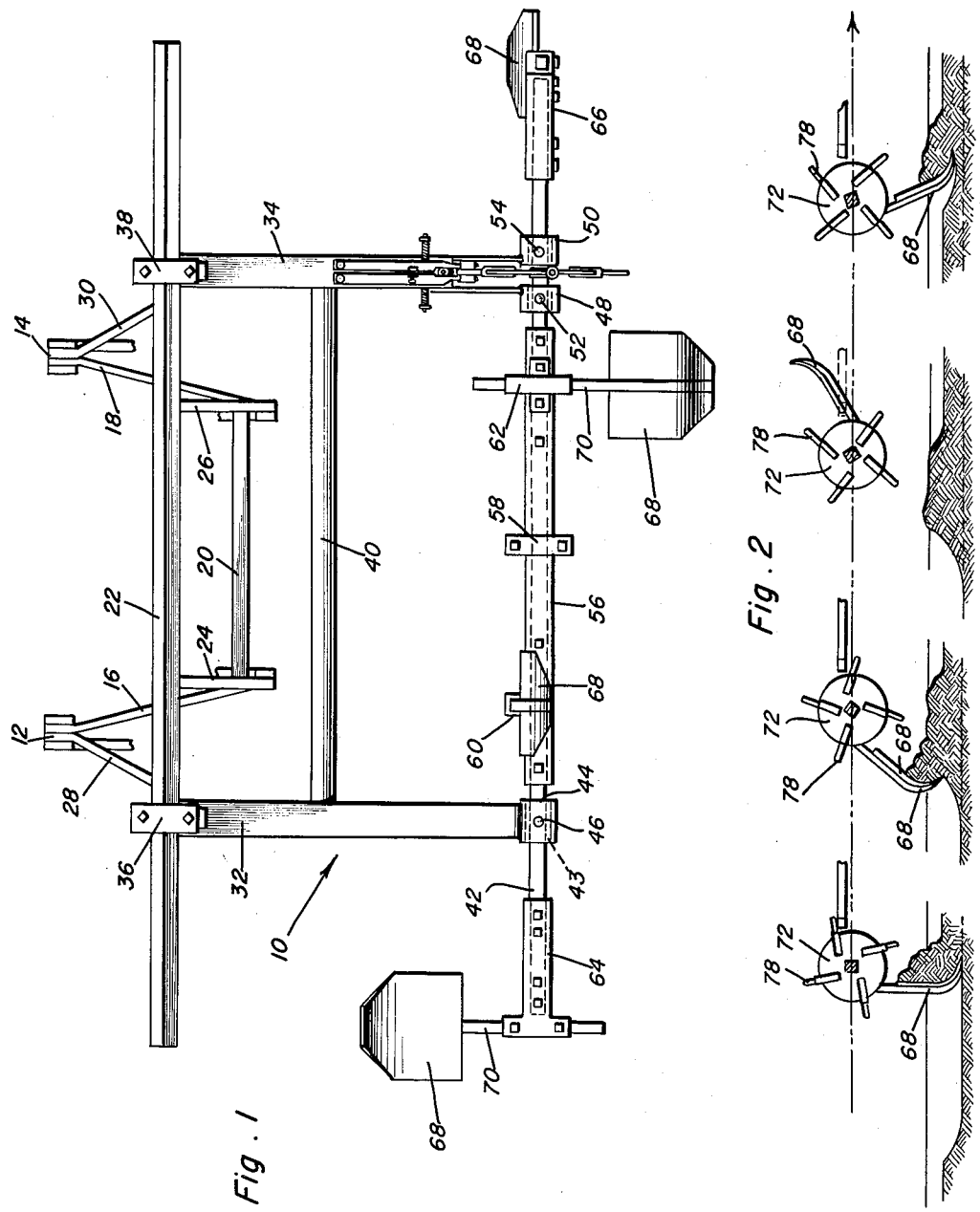

W. KRIEG 2,987,128

SOIL DAMMING IMPLEMENT

Filed June 11, 1957

Werner Krieg
INVENTOR.

BY *Clarence A. O'Brien*
and *Harvey B. Jacobson*
Attorneys

United States Patent Office 2,987,128
Patented June 6, 1961

2,987,128
SOIL DAMMING IMPLEMENT
Werner Krieg, Eola, Tex.
Filed June 11, 1957, Ser. No. 665,046
5 Claims. (Cl. 172—528)

This invention relates to the general class of farm implements and more particularly to a soil damming implement designed to be drawn by a plow, cultivator or a tractor.

In the well known method of lister cultivation commonly employed in semi-arid regions, the lister furrows are dammed during the fallow season to conserve moisture and prevent the soil from being blown away. The present damming implement may be attached to a seeder to continuously form spaced dams in the furrows immediately after the seeding operation.

A primary object of the present invention is to provide an implement which may be attached to a conventional lister for forming dams in the lister furrows.

Another object is to provide a damming implement designed to be drawn by any tractor to provide dams in the furrows thereby preventing excessive water run-off.

A further object of the present damming implement is to provide novel shovel blade actuating means and detent mechanism to form spaced dams in lister furrows.

A still further object is to provide a novel arrangement of shovel blades whereby one damming row or a plurality of damming rows may be formed in a furrow.

A further object is to provide a relatively simple and inexpensive damming implement which effectively provides that desired function.

A more specific important object of this invention is to provide a mechanism whereby a shovel blade may be held in operative position in a furrow scraping earth therefore to form a dam, and which shall be automatically operable to release the shovel when a predetermined quantity of soil has been collected in a dam and then position and retain a succeeding shovel for repeating the operation and thereby form successive dams; and wherein the size of the dams may be adjusted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the present damming implement;

FIGURE 2 is a diagrammatic view of the shovel blade actuating means showing the movement in sequence of the shovel blade as it performs the damming function;

Figure 5:
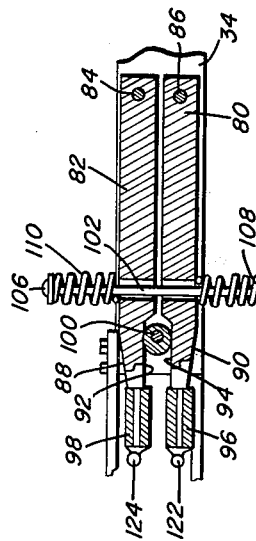
FIGURE 5 is a detail view in horizontal longitudinal central section of FIGURE 4 and illustrates the detent mechanism in more detail.
Figure 4:
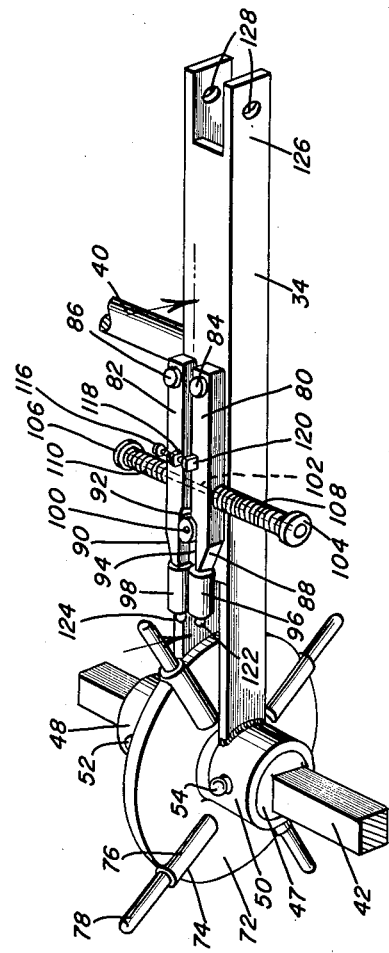
FIGURE 4 is a perspective view of a portion of the present implement showing the shovel blade actuating means together with the detent mechanism.

Referring now more specifically to the drawing by distinguishing reference numerals it will be observed that 10 designates generally a preferred embodiment of the present invention which is attached to a tractor by any conventional structure, such as the hitch plates 12 and 14, from which extend backwardly biased draft members 16 and 18 connected to a transverse draft brace 20 secured to the transverse bar 22 by attaching bars 24 and 26.

This conventional structure further includes draft brace bars 28 and 30 extending from the hitch plates rearwardly and which are secured to the transverse bar 22.

The attachment or implement includes a supporting frame comprising end frame members 32 and 34 adjustably connected to the transverse bar 22 by the adjustable coupling members or brackets 36 and 38. A transverse frame brace 40 extends laterally between end frame members 32 and 34 intermediate their ends to provide a rigid, non-twisting frame. A square shaft 42 is disposed transversely of the frame and is provided with bushings 43 which are journaled within a bearing 44 carried on the extremity of end frame member 32. The bearing 44 is provided with a grease fitting 46 and may be of any suitable design to accommodate the square shaft 42.

The shaft 42 is further journaled by bushings 47, received in the bearings 48 and 50 which are disposed in spaced relation on the bifurcated extremity of frame member 34. Bearings 48 and 50 are of a similar construction to that of bearing 44 and are provided with grease fittings 52 and 54.

A transverse stiffening plate 56 is secured to the shaft 42 intermediate the frame members 32 and 34 and is provided with a centrally located shovel blade socket 58. Additional shovel blade retaining sockets 60 and 62 are secured to the transverse stiffening plate 65 at any desired position between the end frame members 32 and 34. Shovel blade socket extensions 64 and 66 are positioned on both laterally projecting extremities of shaft 42 and are secured thereto. A plurality of shovel blades 68 are secured to the various shovel blade sockets by the shovel retaining shafts 70.

Means are provided for effecting intermittent rotation of shaft 42 on the shovel blades carried thereby. For this purpose, a disk 72 is fixedly secured to shaft 42 for rotation therewith and is positioned between bearings 52 and 50. The disk 72 is provided with a plurality of circumferentially spaced, radial notches 74 to receive sockets 76 in which are seated the radially projecting frictionally retained removable pins 78.

Detent mounting bars 80 and 82 are secured to end frame member 34 by bolts 84 and 86 at their forward ends. The detent mounting bars 80 and 82 have their outer surfaces 88 and 90 forwardly convergent and with their inner surfaces 92 and 94 being laterally recessed and forming arms provided with parallel, forwardly projecting rollers 96 and 98 journaled thereon. The detent mounting bars are positioned in spaced relation and embrace an eccentric 100 positioned between the inner surfaces 92 and 94.

A transverse adjusting pin 102 extends through detent mounting bars 80 and 82 with the extremities thereof extending outwardly. The extremities of pin 102 carry caps 104 and 106 secured thereto by rivets or other suitable means. Springs 108 and 110 surround the pin 102 and provide pressure against the inner surface of caps 104 and 106 and against the outer surfaces of the detent mounting bars 80 and 82.

An adjusting screw 116 is threaded into upstanding threaded lug 118 secured to detent mounting bar 82 and abuts an upstanding lug 120 secured to detent mounting bar 80. The operation of the adjusting screw 116 against the pressure of springs 108 and 110 provides means to adjust the distance between detent mounting bars 80 and 82.

The rollers 96 and 98, journaled upon the arms of detent mounting bars 80 and 82 utilize any suitable bearing means and are provided with grease fittings 122 and 124.

The end frame member 34 is bifurcated to provide a yoke 126 having transversely aligned openings 128. The adjustable coupling member 38 is positioned within yoke 126 and is provided with an opening complementary to those of the openings 128 and is pivoted thereto by bolt 130. The adjustable coupling member 38 is provided with a shoulder 132 and a detachable cap member 134 secured by bolts 138. There is further provided a rearwardly extending and downwardly inclined arm 142 having an upwardly extending boss 144 on the upper surface thereof. An adjusting screw 150 extends through the boss and abuts a plate 152 secured to the underside of the end frame member 34 at a position opposite that of the boss 144 and is provided with a downwardly extending abutment member 156 for engagement by the adjusting screw 150. The structure described with reference to the member 34 is to be understood as also being applicable to the member 32.

Figure 3:
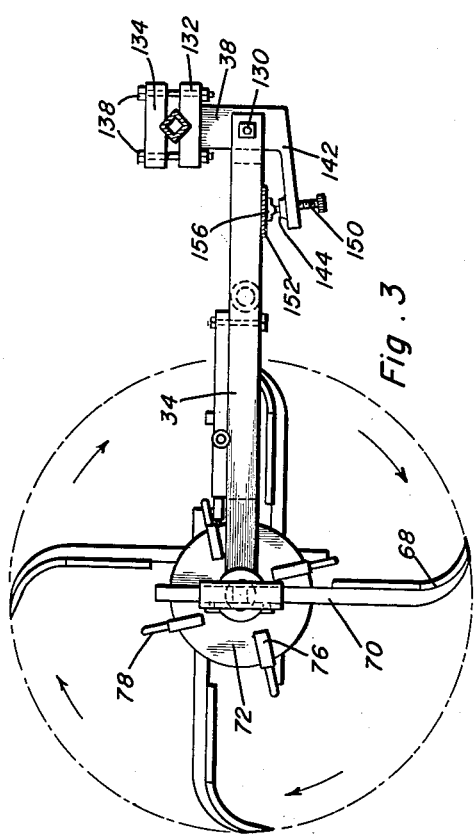
FIGURE 3 is a side elevational view of the present implement, parts being omitted and parts being shown in vertical section and showing the shovel blade members, the shovel blade actuating means and the adjustable coupling means.

As will be seen in FIGURE 3 of the drawing, rotation of the hand adjusting screw 150 will effect an upwardly or downwardly pivotal movement of member 34 carried by the arm 142 about bolt 130 thereby adjustably varying the depth that the shovel blades project into the soil.

It is apparent that effective operation of the damming implement, in forming a predetermined series of spaced dams on a furrow, will depend upon the spacing between the rollers 96 and 98 which periodically yieldingly retain and release the pins 78. This adjustment is effected by adjusting in any suitable manner, not shown, the eccentric 100 thereafter turning adjusting screw 116 which brings upstanding lugs 118 and 120 into varying spaced relationships thereby retaining the detent mounting bars 80 and 82 in the proper spaced relation against the pressure of springs 108 and 110.

In operation, one of the shovel blades 68 is engaging the soil as shown in the first sequence of FIGURE 2 of the drawing. Thereupon, one of the pins 78 which extends forwardly and substantially parallel with the ground surface will rest in juxtaposition between the rollers 96 and 98. As the soil being engaged by one of the shovel blades 68 piles up ahead of the blade the added resistance thereof forces the pin 78 through the rollers 96 and 98 thereby allowing the shovel blade 68 to rotate upwardly in a clockwise direction and out of engagement with the soil.

At this point another shovel blade positioned along the shaft 42 to provide dams in an adjacent furrow is rotated in a clockwise direction into engagement with the soil, with a second pin 78 of the disk 72 now engaging rollers 96 and 98 and held therebetween as previously described. The operation of the shovel blade in engagement with the soil is repeated for the other shovel blades spaced along the shaft 42 thereby providing a damming function in a plurality of furrows. The damming implement is being drawn forward in the direction shown by the arrow in FIGURE 2 by any suitable tractor as the periodic damming function is performed. It is apparent that one or a plurality of shovel blades may be utilized to dam one or more of furrows as desired.

The proper intermittent operation of the shovel blades is maintained by adjustment of the detent mechanism as previously described in its engagement with the pins 78 of the disk 72. The adjustable coupling members 36 and 38 enables the shaft 42 carrying the shovel blade 68 to be raised upwardly when the damming implement is not in operation but is in transport along a road or field. The adjustable coupling means 36 and 38 further provide means to regulate the height of the dam effected by adjusting the upward and downward position of the shaft 42.

In instances where only a single shovel blade is desired, it is secured to the central socket 58 provided for that purpose. It is apparent that the particular configuration of the shovel blade 68 shown in the drawings are for purposes of illustration only and that any desired blade shape may be utilized depending upon the seeded crop and dam formation required. In the embodiment illustrated in the drawings the socket 76 and the pin 78 are positioned approximately 90° apart and extend outwardly from spaced positions along a predetermined circumference outwardly from the center of rotation of the disk 72, whereby the pins 78 are caused to align themselves substantially horizontal and parallel with the rollers 96 and 98 upon contact thereof, thereby providing effective seating of the pin 78 with the peripheral surface of the rollers 96 and 98. It will be understood that the circumferential spacing of the shovels about the shaft 42 will correspond to that of the pins 78 about the disk 72.

The foregoing is considered as illustrative only of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An agricultural implement for forming sequentially spaced dams in furrows comprising a mobile supporting frame, a shaft rotatably supported by said frame, a plurality of shovel blades fixedly secured to and rotatable with said shaft and projecting outwardly from said shaft and disposed for travel in said furrows, shaft rotation control means carried by said frame and operatively connected to said shaft, said control means comprising pins fixedly secured to said shaft and rotatable thereby in a plane perpendicular to said shaft, resilient detent means carried by said frame and engageable by said pins during their rotation with said shaft and yieldingly opposing such rotation and yieldable to release said pins and shaft for further rotation when said shovels have encountered sufficient resistance by the soil piled thereby into a dam to overcome the resistance of said resilient detent means, said detent means comprising a pair of mounting bars in spaced side-by-side relation and carried by said frame and projecting towards said shaft, a pair of members each carried by a mounting bar and disposed in parallel spaced relation and positioned for successive engagement by said pins and for passage of the latter therebetween upon rotation of said pins with said shaft, means resiliently urging said members towards each other in position for yieldingly resisting passage of said pins therebetween.

2. An agricultural implement for forming sequentially spaced dams in furrows comprising a mobile supporting frame, a shaft rotatably supported by said frame, a plurality of shovel blades fixedly secured to and rotatable with said shaft and projecting outwardly from said shaft, and disposed for travel in said furrows, shaft rotation control means carried by said frame and operatively connected to said shaft, said control means comprising pins fixedly secured to said shaft and rotatable thereby in a plane perpendicular to said shaft, resilient detent means carried by said frame and engageable by said pins during their rotation with said shaft and yieldingly opposing such rotation and yieldable to release said pins and shaft for further rotation when said shovels have encountered sufficient resistance by the soil piled thereby into a dam to overcome the resistance of said resilient detent means, said detent means comprising a pair of mounting bars in spaced side-by-side relation and carried by said frame and projecting towards said shaft, a pair of members each carried by a mounting bar and disposed in parallel spaced relation and positioned for successive engagement by said pins and for passage of the latter therebetween upon rotation of said pins with said shaft, means resiliently urging said members towards each other into position for yieldingly resisting passage of said pins therebetween, said members comprising each a roller journaled on a bar with the axis of rotation of the roller being in side-by-side relation to that of its mounting bar.

3. The combination of claim 1 wherein said bars are each mounted on said frame for movement towards and from each other, said members being each fixedly mounted upon a bar, said resilient means being engaged to said bars and urging the latter towards each other.

4. The combination of claim 2 wherein said rollers lie between said bars.

5. The combination of claim 4 wherein said rollers extend beyond the ends of said bars towards said detent means.

References Cited in the file of this patent

UNITED STATES PATENTS

| | | |
|---|---|---|
| 504,756 | Schofield | Sept. 21, 1893 |
| 1,799,098 | Hedrick | Mar. 31, 1931 |
| 1,944,939 | Kunderd | Jan. 30, 1934 |
| 2,098,738 | Campbell | Nov. 9, 1937 |
| 2,193,275 | Elliott | Mar. 12, 1940 |
| 2,249,864 | Silver | July 22, 1941 |
| 2,308,536 | Peacock | Jan. 19, 1943 |
| 2,780,975 | Gunning | Feb. 12, 1957 |

FOREIGN PATENTS

| | | |
|---|---|---|
| 134,258 | Australia | Sept. 13, 1949 |
| 162,008 | Australia | Mar. 18, 1955 |